Sept. 7, 1965  TAKEO SEKI ETAL  3,205,415
PERMANENT MAGNET DEVICE
Filed Dec. 24, 1962

INVENTORS
Takeo Seki
Ryoka Sawada
Yoshihisa Suzuki
By: Paul M. Craig, Jr.
ATTORNEY

United States Patent Office 3,205,415
Patented Sept. 7, 1965

3,205,415
PERMANENT MAGNET DEVICE
Takeo Seki, Ryoka Sawada, and Yoshihisa Suzuki, Tokyo, Japan, assignors to Hitachi, Ltd., Tokyo, Japan, a corporation of Japan
Filed Dec. 24, 1962, Ser. No. 246,764
Claims priority, application Japan, Dec. 27, 1961, 36/47,163
12 Claims. (Cl. 317—200)

The present invention relates generally to permanent magnet devices and more particularly to those usable with electron tubes as a magnetic field producing device for focusing the electron beam formed therein.

In the past, a number of difficulties have been encountered, for example, with conventional electron tubes requiring a magnetic field for the focusing of the electron beam formed therein particularly when they have employed an ordinary permanent magnet device for this purpose. With such electron tubes, firstly the magnetic field formed between the magnetic pole pieces has generally been reduced in strength because of the leakage of the magnetic flux. Moreover, where the entire device is magnetically shielded to avoid any leakage of the magnetic flux to the exterior, a shielding case has been required that has an extremely large capacity so as to eliminate any adverse effects of the shielding case including the flux leakage thereto which might occur when the case is arranged excessively close to the magnet device.

The present invention has overcome these difficulties by providing a generally cylindrical permanent magnet device comprising a permanent magnet defining a magnetic field space, a casing of magnetic material enclosing said permanent magnet to magnetically shield the latter, and a structure including a combination of a plurality of permanent magnet pieces arranged inside of the peripheral wall of said casing so as to be held at a magnetic potential reduced to zero along the inner surface of said peripheral wall.

The present invention will now be described with reference to the accompanying drawings, which illustrate a few embodiments of the invention and in which FIGS. 1 to 3, inclusive, are diagrammatic cross-sectional views of respective embodiments of the invention.

Figure 1:
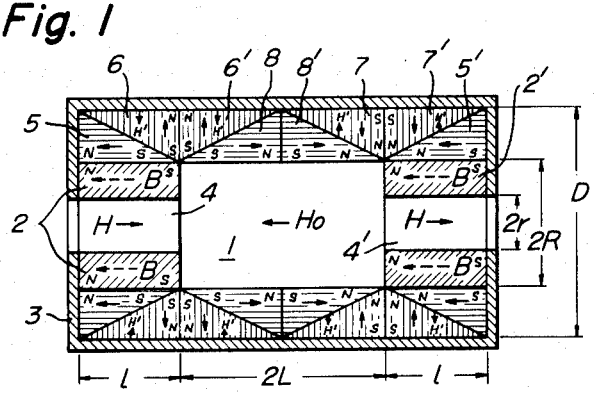

Referring first to FIG. 1, there is shown a permanent magnet device comprising a permanent magnet including a pair of hollow cylindrical magnet pieces 2 and 2', which are in spaced aligned relation to each other each having an outer diameter, 2R, and an inner diameter, 2r, to form an axial magnetic field, $H_0$ (the direction of which is indicated by the arrow) in a cylindrical space 1 having a diameter, 2R, and a length, 2L. The permanent magnet 2–2' with the cylindrical space 1 defined therein is enclosed by a casing 3 of a high permeability material provided for magnetically shielding the entire device. The direction of the magnetic field H formed in each of the cylindrical spaces 4 and 4' within the respective cylindrical magnet pieces 2 and 2' is indicated by the arrow and the magnetic flux density in each of said magnet pieces 2 and 2' is represented by B. Ring type permanent magnet pieces 5, 5', 6, 6', 7, 7', 8 and 8' have respective cross-sectional configurations as illustrated and are each magnetized in the direction indicated by the arrow. These ring type permanent magnet pieces are arranged to together form a cylindrical magnet assembly having an outer diameter, D, as illustrated. Each of the ring type permanent magnet pieces is not required to form a magnetic flux by itself as long as it is held at an appropriate magnetic potential having a configuration and a coercive force which satisfy the conditions described below.

The permanent magnet pieces 5 and 5' at opposite ends of the cylindrical magnet assembly each have a coercive force, which is equal in magnitude and opposite in direction to the magnetic field H formed by the magnet piece 2 or 2' so that the magnetic potential is reduced to zero along the adjacent end wall of the shielding case 3. The outer magnet pieces 6, 6', 7 and 7' are arranged in close contact with the peripheral wall of the shielding casing and each have such a coercive force, H', such that the magnetic potential is reduced to zero along the peripheral wall of the casing. The outer magnet pieces 6, 6', 7 and 7' are magnetized in the radial direction and in respective orientations as indicated by the arrows. The remaining two magnet pieces 8 and 8' each have an inner cylindrical surface extending in the direction of the magnetic field $H_0$ to encircle the space 1 and have a coercive force of the magnitude $H_0$ to maintain the magnetic potential at a definite value along the inner cylindrical surface of the magnet piece. The direction of magnetization of these magnet pieces 8 and 8' is opposite to the direction of the magnetic field in said space 1.

The magnetic potential relationship between the permanent magnet 2–2' and the space 1 is expressed by the equation $$H \cdot l = H_0 \cdot L \tag{1}$$

where $l$ represents the axial length of each of the magnet pieces 2 and 2'. The relation between the outer radius R and the inner radius r of the magnet 2–2' is expressed by the following equation based upon the continuity of the magnetic flux.

$$\pi \cdot B \cdot (R^2 - r^2) = \pi \cdot H_0 \cdot R^2 + \pi \cdot H \cdot r^2$$

From this equation, R is obtained as follows.

$$R^2 = \frac{B+H}{B-H_0} r^2 \tag{2}$$

The magnet pieces 6, 6', 7 and 7' having a coercive force H', the following equation is obtained based upon the magnetic potential relationship.

$$\frac{D-2R}{2} \cdot H' = H \cdot l = H_0 \cdot L$$

From this, D is obtained as follows.

$$D = 2\left(R + \frac{H_0}{H'} \cdot L\right)$$
$$= 2\left(\sqrt{\frac{B+H}{B-H_0}} \cdot r + \frac{H_0}{H'} \cdot L\right) \tag{3}$$

Assuming that the material of shielding case 3 has a sufficiently high permeability and the wall thickness of the case is negligible, the volume V of the entire device described above is $$V = \frac{\pi}{4} \cdot D^2 (2L + 2l)$$
$$= 2\pi \left(\sqrt{\frac{B+H}{B-H_0}} \cdot r + \frac{H_0}{H'} \cdot L\right)^2 \cdot L \cdot \left(1 + \frac{H_0}{H}\right) \tag{4}$$

It is noted that as the value H' increases the volume V is reduced and thus the magnet pieces 6, 6', 7 and 7' should be made of a material having a coercive force as large as possible. For example, the entire volume V of the device including magnet pieces 6, 6', 7 and 7' of a ferrite having a coercive force, H'=2000 oersteds, and the remaining magnet pieces formed of a ferrite of B=2000 Gauss and H=1800 oersteds, assuming that 2r=3.5 cm., L=5.0 cm. and $H_0$=1500 oersteds, is calculated as $$V = 4250 \text{ cm.}^3$$

In contrast, a conventional magnet device designed to give a magnetic field equivalent to that in the above example has the entire volume of the order of $V=11,902$ cm.$^3$, even if a 20% flux leakage to the exterior be allowed.

It will be apparent that the device of the present invention, which is constructed so as to hold the magnetic potential at zero along the inner walls of the shielding case, there occurs substantially no leakage of the magnetic flux to the exterior. With conventional devices, an extremely large shielding case would be required to eliminate the flux leakage, resulting in an extreme volume of the entire device.

It will also be appreciated that, with the device of the invention, the magnetic potential is held at a definite value along the inner peripheral wall of the magnet pieces 8 and 8' so that quite a uniform magnetic field is formed in the space therefor.

Figure 2:
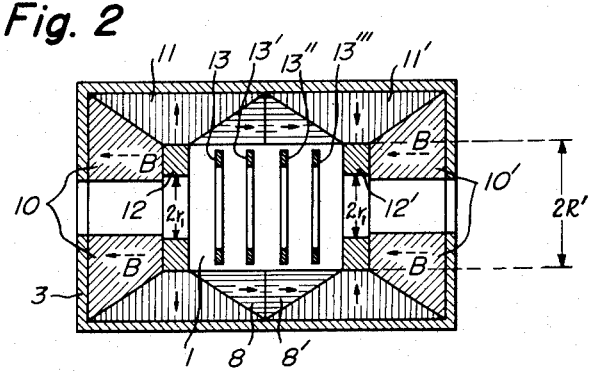

As an alternative, the magnet pieces 2, 5 and 2', 5' in the embodiment illustrated in FIG. 1 may be combined into respective integral magnet pieces 10 and 10' and the magnet pieces 6, 6' and 7, 7' into respective integral magnet pieces 11 and 11', with a pair of annular pole pieces 12 and 12' of rectangular cross section each arranged with its outer edge surface in contact with the inner peripheral surface of the adjacent magnet piece 11 or 11', as illustrated in FIG. 2, so that the magnetic flux through the magnet pieces 11 and 11' may be utilized effectively. Additionally, field straighteners 13, 13', 13" and 13''' may be arranged in the space 1 for the purpose of correcting any inclination of the axis of the magnetic field due to the non-uniformity of the magnet material and the manufacturing errors of the element and/or improving the uniformity of the magnetic field formed in the space 1.

Figure 3:
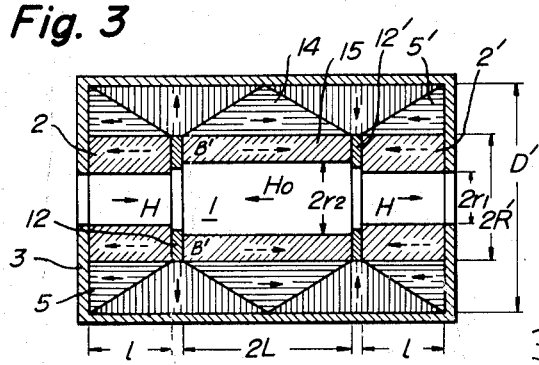

In FIG. 3, which illustrates a further embodiment of the invention, a permanent magnet 14 is employed in place of the two magnet pieces 8 and 8' shown in FIGS. 1 and 2. A permanent magnet 15 is arranged in the space 1 of the device for the purpose of further reducing the entire volume of the device, and is formed to have a magnetic flux, B', with a coercive force, $H_0$. The permanent magnet 15 may be formed integral with the permanent magnet 14.

For convenience's sake, assume that the magnetic pole pieces 12 and 12' are formed of a material having an infinitely large permeability and their thickness are negligible. Where the permanent pieces 12 and 12' have an inner diameter, $2r_1$, and the permanent magnet 15 an inner diameter, $2r_2$, the following equation is obtained based upon the continuity of the magnetic flux.

$$B \cdot \pi \cdot (R'^2 - r_1^2) + B' \cdot \pi \cdot (R'^2 - r_2^2)$$
$$= H_0 \cdot \pi \cdot r_2^2 + H \cdot \pi \cdot r_1^2 \qquad (5)$$

and hence the outer radius R' of the permanent magnets 2–2' and 15 is $$R'^2 = \frac{(B+H)r_1^2 + (B'+H_0)r_2^2}{B+B'} \qquad (6)$$

In this case, R' decreases with the decrease in $r_1$ and $r_2$, but since $r_1$ and $r_2$ are usually not smaller than the radius r of the aperture through which a unit is inserted for the utilization of the magnetic field formed in the device, the minimum value of R' is obtainable when $r_1 = r_2 = r$ as follows.

$$R'^2 = \frac{B+B'+H+H_0}{B+B'} \cdot r^2 \qquad (7)$$

Accordingly, the outer diameter D' of this device is $$D' = 2\left(R + \frac{H_0}{H_1}L\right)$$

$$= 2\left(\sqrt{\frac{B+B'+H+H_0}{B+B'}} \cdot r + \frac{H_0}{H'} \cdot L\right) \qquad (8)$$

And the entire volume V" of the device is expressed by the following formula.

$$V'' = 2\pi \left(\sqrt{\frac{B+B'+H+H_0}{B+B'}} \cdot r + \frac{H_0}{H'} \cdot L\right)^2 \cdot L\left(1 + \frac{H_0}{H}\right) \qquad (9)$$

For example, where the device employs a permanent magnet 15 formed of a ferrite of B'=2200 gauss and $H_0$=1500 oersteds, other conditions being the same as with the case of the embodiment shown in FIG. 1, the entire volume V" obtained from the Formula 9 is $$V'' = 2140 \text{ cm.}^3$$

This indicates the construction shown in FIG. 3 is effective to further reduce the size of the device.

As apparent from the foregoing description, according to the present invention, a permanent magnet device of the type adapted to form a uniform magnetic field in a space intended for the purpose and including means for magnetically shielding the entire device comprises permanent magnets arranged according to their respective directions of magnetization so that the resultant magnetic potential along the outer wall of the device is held at zero and the potential distribution along the inner surfaces of those magnets encircling the field space varies linearly, in the direction of the axis of the desired magnetic field. It will be appreciated that with this arrangement the entire permanent magnet device is substantially reduced in size and is able to form a uniform and substantially leakless magnetic field in the field space defined therein and is suitable for many magnetic applications and particularly for use with electron tubes as a field device for focusing the electron beam formed therein.

What is claimed is:

1. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means.

2. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means.

3. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means, said direction of magnetization of said annular inner members being opposite in direction to the direction of the magnetic field in said magnetic field space and parallel thereto.

4. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the resultant magnetic potential over the entire outer surface of said magnet means is zero and the potential distribution along the inner surface of said magnet means adjacent said magnetic field space varies linearly in the direction of the cylindrical axis of said magnet means.

5. A permanent magnet device for producing a uniform magnetic field within a defined magnetic field space comprising a substantially cylindrical hollow magnet means surrounding said magnetic field space for producing said uniform magnetic field therein and shield means substantially completely enclosing said magnet means, said magnet means consisting of a plurality of annular magnet members with their respective directions of magnetization arranged so that the resultant magnetic potential over the entire outer surface of said magnet means is zero and the potential distribution along the inner surface of said magnet means adjacent said magnetic field space varies linearly in the direction of the cylindrical axis of said magnet means, said magnet members including inner magnet members and outer magnet members forming the inner and outer surfaces of said cylindrical hollow magnet means, respectively, said inner members bounding said magnetic field space having a direction of magnetization parallel to the cylindrical axis of said magnet means.

6. A permanent magnet device for producing a uniform magnetc field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means, said direction of magnetization of said annular inner members being opposite in direction to the direction of the magnetic field in said magnetic field space and parallel thereto, the magnetization of each of said magnet members forming the outer surface of said magnet means being in a direction perpendicular to said surface.

7. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means, annular pole piece means forming the end boundaries for said magnetic field space perpendicular to said inner wall of said magnet means.

8. A permanent magnet device for producing a uniform magnetic field within a defined mangetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means, the magnetization of each of said magnet members forming the outer surface of said magnet means being in a direction perpendicular to said surface, annular pole piece means forming the end boundaries for said magnetic field space perpendicular to said inner wall of said magnet means.

9. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the magnetic polarity over one-half of the outer surface of said magnet means is opposite the magnetic polarity over the other half of the outer surface of said magnet means, said magnet members including a pair of annular inner members forming the inner wall of said magnet means bounding said magnetic field space, said inner members having a direction of magnetization parallel to the cylindrical axis of said magnet means, field straightener means positioned within said magnetic field space substantially perpendicular to the cylindrical axis of said magnet means for correcting undesirable inclinations in the axis of said uniform magnetic field.

10. A permanent magnet device for producing a uniform magnetic field within a defined magnetic field space comprising a substantially cylindrical hollow magnet means surrounding said magnetic field space for producing said uniform magnetic field therein, and shield means substantially completely enclosing said magnet means, said magnet means consisting of a plurality of annular magnet members with their respective directions of magnetization arranged so that the resultant magnetic potential over the entire outer surface of said magnet means is zero and the potential distribution along the inner surface of said magnet means adjacent said magnetic field space varies linearly in the direction of the cylindrical axis of said magnet means, said magnet members including inner magnet members and outer magnet members forming the inner and outer surfaces of said cylindrical hollow magnet means, respectively, said inner members bounding said magnetic field space having a direction of magnetization parallel to the cylindrical axis of said magnet means, the direction of magnetization of said outer magnet members being perpendicular to the outer surface of said magnet means and one-half of said magnet means formed by said outer magnet members having an opposite polarity of magnetization from the other half.

11. A permanent magnet device for producing a uniform magnetic field within a defined magnetic field space comprising substantially hollow magnet means surrounding said magnetic field space for producing said uniform magnetic field therein, and shield means substantially completely enclosing said magnet means, said magnet means consisting of a plurality of magnet members oriented in accordance with their direction of magnetization such that the resultant magnetic potential over the outer surface of said magnet means is zero.

12. A permanent magnet device for producing a uniform magnetic field within a defined magnetic field space comprising substantially hollow magnet means surrounding said magnetic field space for producing said uniform magnetic field therein, and shield means substantially completely enclosing said magnet means, said magnet means consisting of a plurality of magnet members oriented in accordance with their direction of magnetization such that the resultant magnetic potential over the outer surface of said magnet means is zero, the potential distribution along the inner surface of said magnet means adjacent said magnetic field space being maintained at a definite value by inner magnet members forming said inner surface.

References Cited by the Examiner

UNITED STATES PATENTS

| | | | |
|---|---|---|---|
| 2,503,173 | 4/50 | Reisner | 317—201 |
| 2,925,517 | 2/60 | Glass | 317—200 |

FOREIGN PATENTS

| | | |
|---|---|---|
| 842,531 | 7/60 | Great Britain. |

JOHN F. BURNS, *Primary Examiner.*